United States Patent Office 3,275,538
Patented Sept. 27, 1966

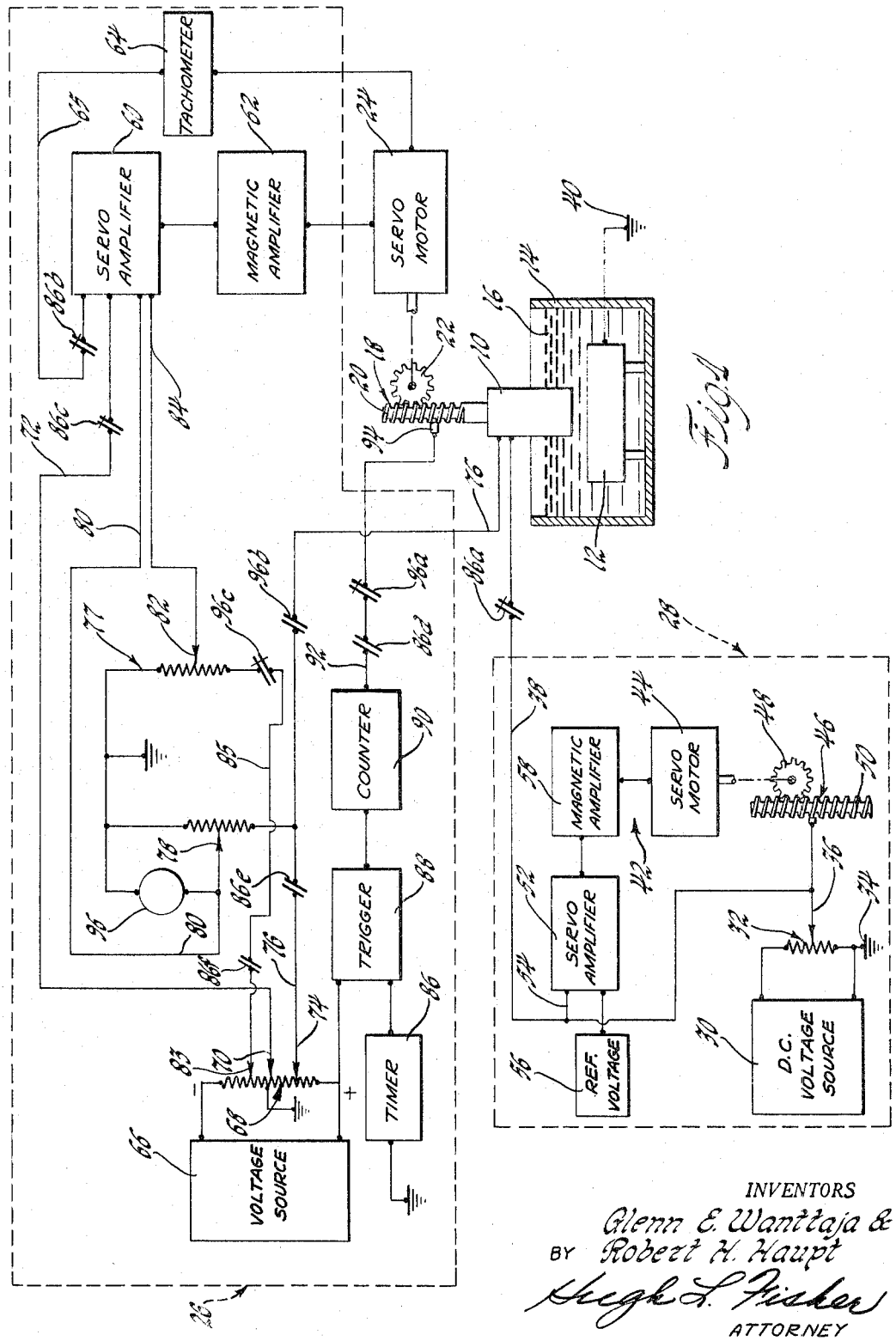

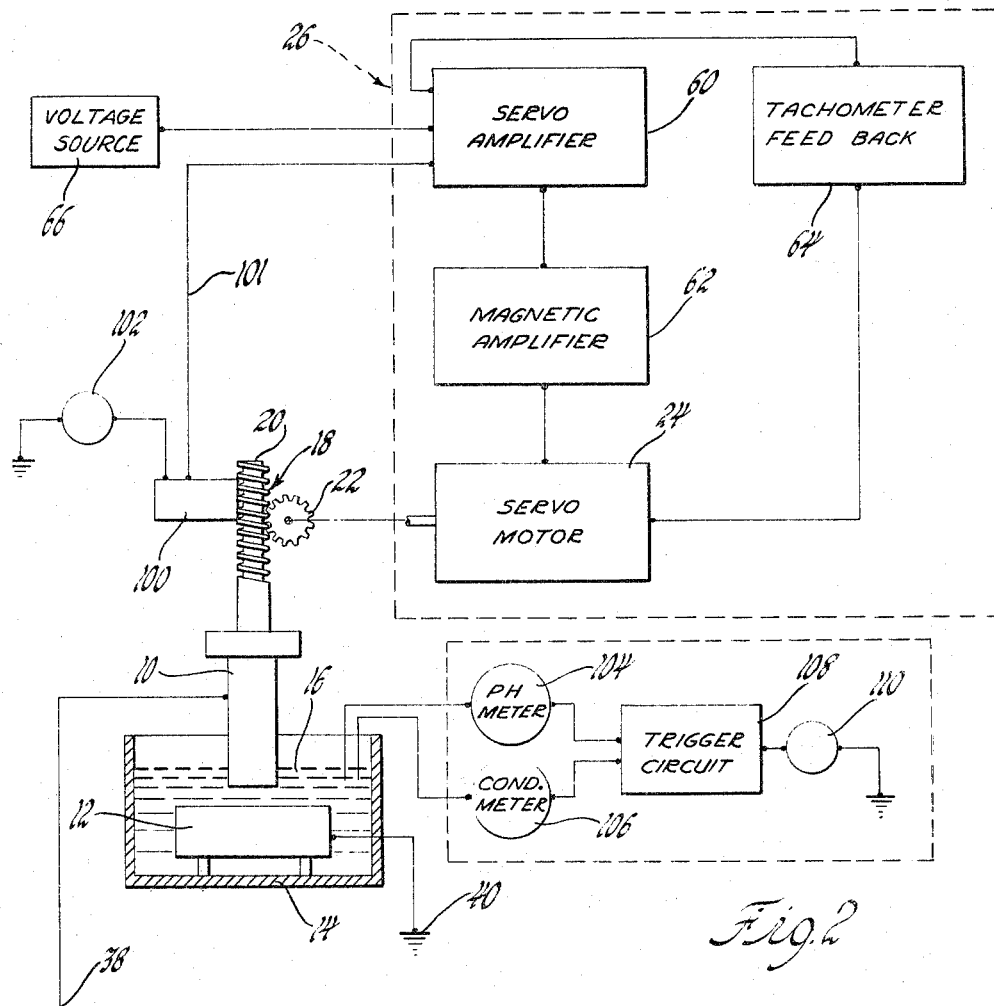

3,275,538
ELECTROCHEMICAL MACHINING METHOD
AND APPARATUS
Robert H. Haupt, Roseville, Mich., and Glenn E. Wantaja, Hales Corners, Wis., assignors to General Motors Corporation, Detroit, Mich., a corporation of Delaware
Filed Sept. 20, 1960, Ser. No. 57,165
17 Claims. (Cl. 204—143)

This invention relates to improvements in method and apparatus for electrochemical machining.

As is well known, stock may be removed from a conductive workpiece by the chemical action from an electrolyte and that this action can be accelerated by the application of current across a gap formed between the conductive workpiece and a cutting tool electrode so that the configuration machined or formed in the workpiece will have a shape corresponding to that of the cutting tool electrode. In this process, which is commonly referred to as the electrochemical process, it is often desired to use a constant feed system in which, e.g., the cutting tool electrode is fed towards the workpiece at a constant rate without requiring careful attention from an operator. But with such a constant feed rate, it is necessary to predict the stock removal rate in order to be certain that the machining is taking place at an optimum rate and that the spacing between the workpiece and the cutting tool electrode is neither too great nor too small.

It has been learned that the electrochemical process conforms to Faraday's law in that the amount of material removed from the workpiece is proportional to the current passed between the cutting tool and workpiece electrodes, and therefore, the potential across the gap therebetween has a direct influence on the gap current. For this reason, then, if the current density within the gap is maintained relatively constant, i.e., the average current applied to the workpiece per square inch of area, the stock removal rate can be accurately forecast.

Accordingly, the invention contemplates for a constant feed rate electrical stock removal apparatus the provision of a control that maintains current density within the gap constant. Specifically, by the invention, gap voltage is maintained constant by altering the power supplied to the gap. The control, according to the invention, senses gap variations and makes alterations in the power supply output.

When employing apparatus of the foregoing type having a constant feed rate, it is necessary from time to time to reset the gap spacing inasmuch as irregularities in the process cause spacing to be altered and this, in turn, affects the efficiency of the apparatus; for example, if the spacing becomes too great, the finish on the workpiece will become rough. Necessarily, manual resetting of the gap requires careful attention from a skilled operator and often must be done at considerable loss in machining time.

It is therefore an aim of the invention to provide a control system wherein the gap spacing is reset automatically at selected intervals. By the invention, the cutting tool and he workpiece electrodes are brought together and then separated until the gap is re-established, this being done periodically and quickly so as to reduce the loss in machining time.

In the electrochemical process, current density may suddenly change and result in faulty operation or, for some reason, particularly with a constant feed system, the gap spacing may be reduced until the cutting tool electrode actually runs into the workpiece electrode. This, of course, can damage not only the feed mechanism but both the die and the cutting tool electrode. When expensive dies are formed, particularly those with complex configuration, there is a substantial investment in the electrode used to form the die. Consequently, it is almost mandatory that the equipment as well as the dies and the cutting tool electrodes be protected during the process.

With this problem in mind, the invention contemplates the provision of safety features in the foregoing control system so that erratic operation is immediately detected and when this erratic operation does happen, the process is immediately halted. Also, provisiion is made by the invention for not only halting the process but separating the electrode and the workpiece so that the process can be recommenced with the proper gap spacing. This enables the error to be corrected and the process to be continued without attention from an operator.

The foregoing and other objects and advantages of the invention will be apparent from the following description and from the accompanying drawings in which:

FIGURE 1 is a diagrammatic showing of apparatus demonstrating principles of the invention; and FIGURE 2 is a diagrammatic showing of the apparatus incorporating further features of the invention.

Referring to the drawings in detail and particularly to the electrochemical machining apparatus in FIGURE 1, the numerals 10 and 12 designate respectively a cutting tool and a workpiece. The cutting tool 10 and the workpiece 12 serve as electrodes in the system as will become apparent. The workpiece 12 is situated within, and insulated from, a container 14 filled with any suitable electrolyte that preferably surrounds workpiece 12 as well as a part of the cutting tool 10.

The cutting tool 10 is maneuvered up and down relative to the workpiece 12 by suitable feed mechanism 18. If preferred, the workpiece 12 can be moved, or both the tool 10 and the workpiece 12 manipulated. In this embodiment, a screw 20 is secured to the cutting tool 10 and is in engagement with a drive gear 22. The gear 22 in turn is driven by a servo motor 24, which may be driven hydraulically, electrically, or in any other known way. Other type feed mechanisms may be employed, e.g., a hydraulically actuated piston may be used.

The apparatus further includes a servo motor control system designated generally at 26 and a power supply denoted by the numeral 28.

Considering first the power supply 28, as shown it includes a D.C. power source 30, the output of which is controlled by a variable resistor as rheostat 32. The rheostat 32 is grounded at 34 and has the adjustable tap 36 therefor connected through a gap power supply line 38 to the cutting tool 10. This line 38 is connected to the negative side of the D.C. source 30 so that with the workpiece 12 grounded at 40, the cutting tool 10 will be negative with respect to the workpiece 12. The power supply circuit is traced from the D.C. source 30 via line 38, to the cutting tool 10 to the workpiece 12 via the electrolyte filled gap therebetween and then by the ground connection 40 back to the ground connection 34 of the rheostat 32.

Since the cutting tool 10 is to be moved towards the workpiece 12 by the feed mechanism 18 at a constant rate, it is desired that the current density, i.e., amperage for square inch of area on the workpiece 12, be relatively constant thereby enabling the amount of stock to be removed over an extended period of time to be accurately predicted. Then because, according to Faraday's law, the amount of stock removed from the workpiece 12 will be proportional to the amount of current flowing across the gap, it is possible to maintain current density constant merely bv maintaining the gap voltage constant. This is because the potential across the gap will determine current flow and current flow will be proportional to this gap voltage.

For the preceding reason, the power supply 28 incorporates a power supply control 42. As illustrated in FIGURE 1, the control 42 includes a servo motor 44 that through a suitable mechanism 46, such as a gear 48 and a screw 50 of the character used by the feed mechanism 18, maneuvers the tap 36 for the rheostat 32. The servo motor 44 is controlled by signals derived from a servo amplifier 52 that has gap voltage via branch 54 and a reference voltage 56 applied to the input thereof. The output of the servo amplifier 52 is connected either through a magnetic amplifier 58 to the servo motor 44, if an A.C. type motor 44 is employed, or is connected directly thereto if the servo motor 44 is of the D.C. type.

During operation, the gap voltage applied to the servo amplifier 52 is compared with the reference voltage 56, and if there is a variation, an error signal developed thereby will cause the servo motor 44 to change the setting of the rheostat 32. Consequently, the output from the D.C. source 30 is varied so that the gap voltage approximates at all times the desired voltage determined by the reference voltage source 56. For example, and without limitation, assume that gap voltage is to be maintained at a negative 10 volts; therefore, a reference voltage of a positive 10 volts will be always applied to the servo amplifier 52. If, then, the gap voltage becomes a minus 8 volts, the control 42 will increase the output from the D.C. source and accordingly the voltage across the gap. In this way, the desired constant current density can be maintained merely by keeping gap voltage relatively constant.

The servo motor control 26 utilizes a servo amplifier 60 that operates similarly to servo amplifier 52 in that a series of input signals, to be explained, are compared or summed and an error signal is developed therefrom that is amplified and either supplied through a magnetic amplifier 62, if an A.C. type servo motor 24 is used, or supplied directly to the servo motor 24 if D.C. One of the input signals to the servo amplifier 60 is a tachometer feedback signal derived from a tachometer 64 driven by the servo motor 24 and supplied to the amplifier 60 by tachometer feedback line 65. This tachometer feedback signal renders the operation of the servo motor 24 more stable in a way well known.

Power for operating the control 26 is obtained from a voltage source 66, the output of which includes a grounded variable resistor such as a rheostat 68. The rheostat 68 has an adjustable tap 70 connected by a reference voltage supply line 72 to the servo amplifier 60, so as to supply a reference signal determined by the position of the tap 70 for constant downfeed of the cutting tool 10. The rheostat 68 also has an adjustable tap 74 connected by line 76 to the cutting tool 10 so that, as will become apparent, a different voltage may be applied across the gap at certain times. The other inputs to the servo amplifier 60 are through a voltage divider network 77 comprising a downfeed potentiometer 78, which connects line 76 thereto via a line 80, and an upfeed potentiometer 82 interconnected between still another adjustable tap 83 of the rheostat 68 and the servo amplifier 60 by lines 84 and 85. The potentiometers 78 and 82 provide downfeed and upfeed signals for reasons to be explained.

Because it is desired that the operation of the servo motor control 26 cause the gap spacing to be adjusted periodically, an appropriate timer 86 is employed. This timer 86 is triggered On at predetermined time spaced intervals and is triggered Off by a trigger 88 in turn operated by a counter 90. The counter 90 is connected by a line 92 to a proximity pickup 94 secured to the screw 20 so as to count the number of turns made by the screw 20. The proximity pickup 94 may be of any known type that develops a signal for each revolution of the screw 20. Timer 86 operates normally closed contacts 86a in gap power supply line 38, normally closed contacts 86b in tachometer feedback line 65, normally closed contacts 86c in reference voltage supply line 72, normally open contacts 86d in line 92, and normally open contacts 86e and 86f, respectively, in lines 76 and 85 in any known way such as by a mechanical linkage connection. Also, the timer 86 operates a relay 96, which relay controls normally closed contacts 96a in the line 92, normally open contacts 96b in line 76, and normally closed contacts 96c between upfeed potentiometer 82 and line 85.

With the foregoing description in mind, the operation of the FIGURE 1 apparatus will now be described. To commence the operation, and assuming that the workpiece 12 is in place, i.e., properly spaced from the cutting tool 10, the D.C. source 30 is turned on. This supplies current to the gap and the cutting action will start. Then, the servo motor 24 will commence to feed the electrode 10 toward the workpiece 12 at a fixed rate determined by the reference voltage or signal applied to the input of the servo amplifier 60 from the reference voltage supply line 72, this reference signal being in turn determined by the position of the rheostat tap 70 at the output of the source 66. Also, the tachometer feedback signal from the tachometer 64 is effective to aid in rendering the servo motor 24 more stable. In cutting, the gap voltage will be maintained relatively constant by the power supply 28 in the manner previously described.

At some preset interval, the timer 86 will time out and open contacts 86a in the gap power supply line 38 so that the power supplied by the power supply 28 is removed from the gap and cutting action is stopped. The timer 86 will also close contacts 86d, 86e, and 86f and open contacts 86b and 86c as well as cause the relay 96 to be energized. When the relay 96 is energized, contacts 96a are opened, contacts 96b closed so as to supply power to the gap via line 76 as determined by rheostat tap 74, and the contacts 96c are opened so that the upfeed signal is not applied to the input of the servo amplifier 60. The downfeed or electrode rapid closing signal is now supplied by line 80 to the servo amplifier 60, this voltage being determined by the position of the downfeed potentiometer 78, and as a result, the output of the servo amplifier 60 will cause the servo motor 24 to move the electrode 10 rapidly downwardly at a speed determined by the downfeed signal. As the gap space reduces, the resistivity of the electrolyte in the gap lowers. This lowers the gap voltage, and therefore produces a reduced downfeed or an electrode slow closing signal since there is little if any current flow through downfeed potentiometer 78. When the cutting tool 10 contacts the workpiece 12, the gap voltage decreases sufficiently and accordingly the downfeed signal that the relay 96 becomes deenergized. Consequently, contacts 96a are closed so as to complete the circuit between the proximity pickup 94 and the counter 90, contacts 96b are opened, removing the power supplied by source 66 to the gap, and contacts 96c become closed. The closure of contacts 96c causes the upfeed signal to be supplied to the servo amplifier 60, this value as mentioned being determined by the upfeed potentiometer 82. The upfeed signal will be dominant when compared with the downfeed signal by the servo amplifier 60, and this will commence rapid upward movement of the cutting tool 10 by the servo motor 24. During this upward movement, because the proximity pickup 94 is connected to the counter 90, the counter 90 will count the number of turns made by the screw 20. When the number of turns is that desired, the counter 90 will render the trigger 88 operative and, as a result, the timer 86 will be recycled causing all of the contacts operated thereby, namely contacts 86a, 86b, 86c, 86e, and 86f, to return to their depicted positions. As a result, the upfeed signal is removed and the normal constant feed or constant speed reference signal from reference voltage supply line 72 is reapplied along with the tachometer signal from line 65 and also the power from the power supply 28 will be again supplied by line 38 to the gap and the process recommenced with the desired gap spacing re-established. The foregoing will be repeated at the intervals determined by the timer 86, i.e., at time spaced intervals, (1) cutting power from the source 30 will be removed and that from source 66 applied to the gap; (2) the cutting tool 10 will be initially fed rapidly toward the workpiece 12, then slowly, and finally stopped when contact with the workpiece 12 is made; (3) the cutting tool 10 will be rapidly withdrawn a predetermined distance and then (4) the process is re-initiated.

In FIGURE 2, the apparatus of FIGURE 1 is shown incorporating safety features that insure against damage to the apparatus as well as to the workpiece 12 and the electrode 10. The first of these safety features interrupts the operation or the process whenever the cutting tool 10 contacts the workpiece 12 with a certain force. To accomplish this, a torque pickup 100 is operatively connected to the screw 20. This pickup 100 may be some form of electrical strain gage and when the cutting tool 10 contacts the workpiece, the increased torque on the screw 20 will cause the pickup 100 to first provide a rapid upfeed signal to the servo amplifier 60 via line 101 and, secondly, energize a relay 102. Energization of the relay 102 will open normally closed contacts 102a between the power supply 28 and the gap, thus interrupting the cutting process, whereas the rapid upfeed signal will cause the servo motor 24 to rapidly separate the cutting tool 10 and the workpiece 12. Then, if desired, the process can be automatically recommenced by the FIGURE 1, system, or manually restarted.

The other safety device causes the process to be interrupted whenever the chemical composition of the electrolytic solution exceeds some predetermined value. To accomplish this, a pH meter 104 and a conductivity meter 106 are exposed to the electrolyte within the container 14 so as to detect variations in the hydrogen content and amount of metal in solution and, accordingly, the current density. When the pH and conductivity exceed a certain value, these meters 104 and 106 will cause a trigger circuit 108 to energize a relay 110. Relay 110 will, then, open normally closed contacts 110a in the line 38 and cut off the supply of power from the power supply 28 to the gap. Similar to the torque pickup 100, the trigger circuit 108 may also, if wanted, provide a rapid upfeed signal to the servo amplifier 60 and cause rapid separation of the cutting tool 10 and the workpiece 12.

From the foregoing it can be seen that the described apparatus can operate with a constant feed rate and with assurance that the current density will be maintained without careful attention from a skilled operator. The resetting of the gap periodically insures that desired workpiece finishes are attained and renders the system far more efficient. Additionally, safeguards are made against the current density suddenly becoming too great due to some defect in the system and against the cutting tool 10 ramming into the workpiece 12.

The invention is to be limited only by the following claims:

1. In electrochemical machining apparatus, the combination of conductive tool and workpiece electrodes spaced apart so as to provide a conductive medium filled gap therebetween, a source of energy applied across the gap so as to effect stock removal from the workpiece electrode, means maneuvering the electrodes relative to each other, control means for the maneuvering means, the control means being so arranged as to repetitively during the process and in sequence interrupt the application of energy across the gap so as to stop the stock removal process, applying a voltage to the gap, decreasing the spacing between the electrodes in accordance with gap voltage and until the gap voltage is of a certain value, increasing the spacing between the electrodes until a predetermined gap is re-established, and then recommence the stock removal process with the electrodes being moved together by the maneuvering means at a relatively constant feed rate, and means sensitive to the current density of the conductive medium for causing the interruption of the process when the current density exceeds a certain value.

2. In electrochemical machining apparatus, the combination of conductive tool and workpiece electrodes spaced apart so as to provide a conductive medium filled gap therebetween, and a source of electrical energy applied across the gap so as to cause stock to be removed from the workpiece electrode, the source including means developing an error signal corresponding to variations in gap voltage relative to a predetermined reference and means operated by the error signal for varying the output of the source so as to cause the gap voltage to correspond to the predetermined reference regardless of gap spacing.

3. In electrochemical machining apparatus, the combination of conductive tool and workpiece electrodes spaced apart so as to provide a conductive medium filled gap therebetween, and a source of electrical energy applied across the gap so as to cause stock to be removed from the workpiece electrode, the source including a comparing circuit for developing an error signal corresponding to variations in gap voltage relative to a reference voltage, a variable impedance arranged to control the output voltage of the source, and means altering the variable impedance in accordance with the error signal so as to cause the gap voltage to correspond to the reference voltage regardless of the gap spacing.

4. In electrochemical machining apparatus, the combination of conductive tool and workpiece electrodes spaced apart so as to form a conductive fluid filled gap therebetween, a feed mechanism for developing a force for moving the electrodes relative to each other, a source of electrical energy applied across the gap so as to effect stock removal from the workpiece electrode, and means responsive to the force applied by the feed mechanism in moving the electrodes relative to each other, the force responsive means being operative when the force exceeds a predetermined value to interrupt the stock removal process.

5. In electrochemical machining apparatus, the combination of conductive tool and workpiece electrodes spaced apart so as to form a conductive fluid filled gap therebetween, a feed mechanism for developing a force for moving the electrodes relative to each other, a source of electrical energy applied across the gap so as to effect stock removal from the workpiece, and means responsive to the force applied by the feed mechanism in moving the electrodes relative to each other, the force responsive means being operative when the force exceeds a predetermined value to interrupt the stock removal process and also cause the feed mechanism to alter the spacing between the electrodes.

6. In electrochemical machining apparatus, the combination of conductive tool and workpiece electrodes spaced apart so as to provide a conductive medium filled gap therebetween, a source of electrical energy applied across the gap, means developing a force for maneuvering the electrodes relative to each other so as to effect stock removal from the workpiece electrode, and direction and speed control means for the electrode maneuvering means, the direction and speed control means including a source of reference voltage corresponding to the rate at which the electrodes are to be moved relative to each other, and a source of voltage corresponding to the force applied by the maneuvering means in moving the electrodes relative to each other in a gap space reducing direction, the direction and speed control means being effective when the source of voltage corresponding to the force applied in moving the electrodes in the gap space reducing direction exceeds a certain value to cause the electrodes to be separated and the stock removal process interrupted.

7. In electrochemical machining apparatus, the combination of conductive tool and workpiece electrodes spaced apart so as to form an electrolyte filled gap therebetween, feed mechanism for moving the electrodes relative to each other, a source of electrical energy applied across the gap so as to effect stock removal from the workpiece electrode, and pH and conductivity meters cooperating to interrupt the application of electrical energy across the gap so as to cause the stock removal process to be interrupted and to cause the feed mechanism to move the electrodes in a gap space increasing direction when the current density of the electrolyte exceeds a certain value.

8. In the method of periodically adjusting the spacing of a conductive tool electrode and a conductive workpiece relative to each other during the electrochemical machining process of removing stock from the workpiece, the repetitive steps including positioning the workpiece and the electrode relative to each other so as to form a predetermined gap therebetween, applying electrical energy across the gap, moving the electrode and the workpiece towards each other so as to effect stock removal from the workpiece, interrupting the application of the electrical energy across the gap so as to stop the stock removal process after a predetermined interval, applying a voltage across the gap, moving the electrode and the workpiece relative to each other in a gap space reducing direction while sensing the gap voltage, stopping the relative movement of the electrode and the workpiece in the gap space reducing direction when the gap voltage is of a certain value, separating the electrode and the workpiece until the predetermined gap is re-established therebetween, and recommencing the stock removal process.

9. In the method of periodically adjusting the spacing of a conductive tool electrode and a conductive workpiece relative to each other during the electrochemical machining process of removing stock from the workpiece, the repetitive steps including positioning the workpiece and electrode with a predetermined gap therebetween, applying electrical energy across the gap, moving the workpiece and electrode towards each other at a relatively constant rate so as to effect stock removal from the workpiece, interrupting the application of the electrical energy to the gap so as to stop the stock removal process after a predetermined time interval, applying a voltage to the gap, moving the electrode and the workpiece relative to each other in a gap space reducing direction in response to gap voltage, stopping the relative movement of the electrode and the workpiece in the gap space reducing direction when the gap voltage is of a certain value, separating the electrode and the workpiece at a rapid rate until the predetermined gap is re-established, and recommencing the stock removal process.

10. In electrochemical machining apparatus, the combination of conductive tool and workpiece electrodes spaced apart so as to provide a conductive medium filled gap therebetween, a source of electrical energy applied across the gap so as to effect stock removal from the workpiece electrode, a voltage source for application to the gap, means maneuvering the electrodes relative to each other, and control means for the maneuvering means and arranged so as to cause the gap spacing to be reset at certain time intervals as stock is being removed from the workpiece electrode, the control means including means determining the direction and speed that the electrodes are to be moved relative to each other by the maneuvering means so that repetitively during the process and in sequence the stock removal process is interrupted, the voltage source is applied to the gap and the gap voltage utilized to cause the maneuvering means to decrease the space between the electrodes to a certain minimum, the spacing between the electrodes is increased until a predetermined gap is re-established therebetween, and thereafter the stock removal process is recommenced with the electrodes being moved relative to each other by the maneuvering means at a relatively constant feed rate.

11. In electrochemical machining apparatus, the combination of conductive tool and workpiece electrodes spaced apart so as to provide a conductive medium filled gap therebetween, a source of electrical energy applied across the gap so as to effect stock removal from the workpiece electrode, a voltage source for application to the gap, maneuvering means for developing a force for moving the electrodes relative to each other, control means for the maneuvering means and arranged so as to cause the gap spacing to be reset at certain time intervals as stock is being removed from the workpiece electrode, the control means including a source of control voltage for the electrode maneuvering means, means developing a gap feedback signal reflecting gap spacing changes due to corresponding variations in the gap voltage for supply to the maneuvering means when the voltage source is applied to the gap, and timing means causing the gap feedback signal and different values of the control voltage to be applied to the electrode maneuvering means so that repetitively during the process and in sequence the stock removal process is interrupted, the voltage source is applied to the gap so as to supply the gap feedback signal to the maneuvering means for causing the maneuvering means to decrease the space between the electrodes to a certain minimum, the spacing between the electrodes is increased until a predetermined gap is re-established therebetween, and thereafter the stock removal process is recommenced with the electrodes being moved together by the maneuvering means at a relatively constant feed rate, and means responsive to the force applied by the maneuvering means in moving the electrodes relative to each other, the force responsive being operative when the force exceeds a predetermined value to also interrupt the stock removal process.

12. In electrochemical machining apparatus, the combination of conductive tool and workpiece electrodes spaced apart so as to provide a conductive medium filled gap therebetween, a source of electrical energy applied across the gap so as to effect stock removal from the workpiece electrode, a voltage source for application to the gap, means maneuvering the electrodes relative to each other, and control means for the maneuvering means and arranged so as to cause the gap spacing to be reset at certain time intervals as stock is removed from the workpiece electrode, the control means comprising a plurality of control signals for controlling the speed and direction that the maneuvering means moves the electrodes relative to each other, the plurality of control signals including an electrode separating control signal and an electrode closing signal, means developing a gap feedback signal reflecting gap spacing changes due to corresponding variations in the gap voltage for supply to the maneuvering means when the voltage source is applied to the gap, switch means rendered operative when the gap feedback signal is of a certain value corresponding to a certain minimum space between the electrodes to cause the electrode rapid separating signal to be supplied to the maneuvering means, and timing means repetitively during the process and in sequence disconnecting both the source of energy from the gap and the electrode closing control signal from the maneuvering means so as to interrupt the stock removal process, the application of the voltage source to the gap so as to supply the gap feedback signal to the maneuvering means for causing the maneuvering means to decrease the space between the electrodes to the certain minimum and thereby render the switch means operative to cause the application of the electrode rapid separating signal to the maneuvering means for separating the electrodes until a predetermined gap therebetween is re-established, the application of the electrode separating control signal to the electrode maneuvering means so that the spacing between the electrodes is increased until a predetermined gap is re-established, then again connecting both the source of energy across the gap and the electrode closing signal to the electrode maneuvering means so as to recommence the stock removal process with the electrodes being moved relative to each other by the maneuvering means at relatively constant feed rate.

13. In electrochemical machining apparatus, the combination of conductive tool and workpiece electrodes spaced apart so as to provide a conductive medium filled gap therebetween, a source of electrical energy applied across the gap so as to effect stock removal from the workpiece electrode, a voltage source for application to the gap, means maneuvering the electrodes relative to each other, and control means for the maneuvering means and arranged so as to cause the gap spacing to be reset at certain time intervals as stock is being removed from the workpiece electrode, the control means comprising a plurality of control signals for controlling the maneuvering means, the plurality of control signals including a constant feed rate signal for causing the electrode maneuvering means to move the electrodes together at a relatively constant rate and an electrode rapid separating signal for causing the electrode maneuvering means to increase the space between the electrodes at a rapid rate, means developing a gap feedback signal reflecting gap spacing changes due to corresponding variations in the gap voltage for supply to the maneuvering means when the voltage source is applied to the gap, switch means rendered operative when the gap feedback signal is of a certain value corresponding to a certain minimum space between the electrodes to cause the electrode rapid separating signal to be supplied to the maneuvering means, and timing means effecting repetitively during the process and in sequence the interruption of the application of both energy from the source to the gap and the electrode slow closing signal to the maneuvering means so as to stop the stock removal process, the application of the voltage source to the gap so as to supply the gap feedback signal to the maneuvering means for causing the maneuvering means to decrease the space between the electrodes to the certain minimum and thereby render the switch means operative to cause the application of the electrode rapid separating signal to the maneuvering means for separating the electrodes until a predetermined gap therebetween is re-established, and then again applying both the energy from the source across the gap and the electrode slow closing signal to the electrode maneuvering means so as to recommence the stock removal process with the electrodes being moved relative to each other by the maneuvering means at the relatively constant feed rate.

14. In electrochemical machining apparatus, the combination of conductive tool and workpiece electrodes spaced apart so as to provide an electrolyte filled gap therebetween, a source of electrical energy applied across the gap so as to effect stock removal from the workpiece, a feed mechanism maneuvering the electrodes relative to each other, and a control system for the feed mechanism and arranged so as to cause the gap spacing to be reset at certain time intervals as stock is being removed from the workpiece electrode, the control system including an auxiliary source of voltage, a counter, a timer triggered On periodically so as to repetitively during the process and in sequence disconnect the main source of energy from the gap and apply the auxiliary source thereto so as to supply a gap feedback voltage reflecting variations in gap spacing to the feed mechanism for causing the space between electrodes to be decreased to a certain minimum and also the gap feedback voltage to be decreased to a predetermined minimum value, and then cause the space between the electrodes to be increased rapidly when the gap feedback voltage is at the predetermined minimum value and until a predetermined distance determined by the counter is re-established whereupon the timer is triggered Off by the counter and the auxiliary source of voltage is disconnected and the main source of energy is reconnected across the gap so as to recommence the stock removal process with the electrodes being moved relative to each other by the feed mechanism at a relatively constant feed rate.

15. In electrochemical machining apparatus, the combination of conductive tool and workpiece electrodes spaced apart so as to provide a conductive medium filled gap therebetween, a source of electrical energy applied across the gap so as to effect stock removal from the workpiece electrode, a voltage source for application to the gap, means maintaining the gap voltage relatively constant regardless of the gap spacing, means maneuvering the electrodes relative to each other, and control means for the maneuvering means and arranged so as to cause the gap spacing to be reset at certain time intervals as stock is being removed from the workpiece electrode, the control means being so arranged as to cause repetitively during the process the source of electrical energy to be disconnected from the gap and the voltage source applied to the gap to develop a gap voltage reflecting gap spacing for causing the maneuvering means to decrease the spacing between the electrodes to a certain minimum and then to cause the maneuvering means to increase the gap spacing so as to re-establish a predetermined gap therebetween.

16. In electrochemical machining apparatus, the combination of conductive tool and workpiece electrodes spaced apart so as to provide a conductive medium filled gap therebetween, a source of electrical energy applied across the gap so as to effect stock removal from the workpiece electrode, means varying the output of the source so as to cause the gap voltage to be relatively constant, a voltage source for application to the gap, means maneuvering the electrodes relative to each other and arranged so as to cause the gap spacing to be reset at certain time intervals as stock is being removed from the workpiece electrode, and control means for the maneuvering means, the control means including a source of control voltage for the electrode maneuvering means, means developing a gap feedback signal reflecting gap spacing changes due to corresponding variations in the gap voltage for supply to the maneuvering means when the voltage source is applied to the gap, and timing means causing the gap feedback signal and different values of the control voltage to be applied to the electrode maneuvering means so that repetitively during the process and in sequence the stock removal process is interrupted, the voltage source is applied to the gap so as to supply the gap feedback signal to the maneuvering means to decrease the space between the electrodes to a certain minimum, the spacing between the electrodes is increased until a predetermined gap is established therebetween, and thereafter the stock removal process is recommenced with the electrodes being moved relative to each other by the maneuvering means at a relatively constant feed rate.

17. In electrochemical machining apparatus, the combination of conductive tool and workpiece electrodes spaced apart so as to provide an electrolyte filled gap therebetween, a source of electrical energy applied across the gap so as to effect stock removal from the workpiece, the source including means developing an error signal corresponding to variations in gap voltage relative to a predetermined reference, means operated by the error signal for varying the output of the source so as to cause the gap voltage to correspond to the predetermined reference, a feed mechanism maneuvering the electrodes relative to each other, a control system for the feed mechanism and arranged so as to cause the gap spacing to be reset at certain time intervals as stock is being removed from the workpiece electrode, the control system including an auxiliary source of voltage, a counter, a timer triggered On repetitively during the process so as to in sequence disconnect the main source of energy from the gap and connect the auxiliary source thereto so as to supply a gap feedback voltage reflecting variations in gap spacing to the feed mechanism for causing the space between the electrodes to be decreased to a certain minimum value and also the gap feedback voltage to be decreased to a predetermined minimum value and then cause the space between the electrodes to be increased rapidly when the gap feedback voltage is at the predetermined minimum value and until a predetermined distance determined by the counter is re-established whereupon the timer is triggered Off by the counter and the auxiliary source of voltage is disconnected and the main source of energy is reconnected across the gap so as to recommence the stock removal process with the electrodes being moved relative to each other by the feed mechanism at a relatively constant feed rate.

References Cited by the Examiner

UNITED STATES PATENTS

| | | | |
|---|---|---|---|
| 2,827,427 | 3/1958 | Barry et al. | |
| 2,927,191 | 3/1960 | Matulaitis | 204—224 |
| 2,933,675 | 4/1960 | Hoelzle | 204—141 |
| 2,939,825 | 6/1960 | Faust | 204—143 |
| 3,058,895 | 10/1962 | Williams | 204—143 |
| 3,060,114 | 10/1962 | Sanders | 204—143 X |
| 3,063,929 | 11/1962 | Phelan | 204—228 |

WINSTON A. DOUGLAS, *Primary Examiner.*

JOHN R. SPECK, JOHN H. MACK, *Examiners.*

P. SULLIVAN, R. GOOCH, A. B. CURTIS,
*Assistant Examiners.*